United States Patent [19]

Hawkins et al.

[11] Patent Number: 4,932,264
[45] Date of Patent: Jun. 12, 1990

[54] MICROBALLOON TAGGED MATERIALS

[75] Inventors: Gary F. Hawkins, Torrance; James R. Lhota, II, Redondo Beach; Patrick M. Sheaffer, Lawndale, all of Calif.

[73] Assignee: The Aerospace Corporation, El Segundo, Calif.

[21] Appl. No.: 250,292

[22] Filed: Sep. 28, 1988

[51] Int. Cl.$^5$ .............................................. G01D 1/12
[52] U.S. Cl. ....................................... 73/709; 73/762; 73/862.53
[58] Field of Search ..................... 73/762, 862.53, 492, 73/709, 787, 801

[56] References Cited

U.S. PATENT DOCUMENTS 3,469,439 9/1969 Roberts et al. ...................... 73/762

Primary Examiner—Charles A. Ruehl
Attorney, Agent, or Firm—William J. Burke

[57] ABSTRACT

A technique for impregnating a fluid so that the impregnated fluid retains information about the highest pressure that has ever been exerted on it. This technique is particularly useful where normal pressure measurement methods are not practical.

1 Claim, 4 Drawing Sheets

MICROBALLOON TAGGED MATERIALS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The field of the invention includes methods of measuring and recording the maximum pressure attained in a fluid, particularly fluids in which the inaccessibility and the small size of the volume under test has made the use of standard pressure transducers difficult.

2. Description of the Prior Art

It is often desirable to measure the pressure or compressive stress to which a fluid has been subjected. Detecting pressure changes is commonly done through the use of pressure transducers. These pressure transducers are usually electrical in nature and take the form of strain gages, moving-contact resistance element, or inductance, reluctance, capacitative or piezo electric devices. Standard pressure transducers are accurate and generally satisfactory.

These transducers do have at least two shortcomings. First, they require a minimum volume in which to operate. In most cases, about 0.1 cubic centimeter is necessary to accommodate even the smallest transducer. A second shortcoming is the need for electrical connections to be routed to and from the volume to be measured. In some cases, providing the necessary electrical leads with access to the volume to be measured is difficult, other shortcomings include selecting a measuring technique which is inert, inexpensive and effective over a wide range of pressures.

Both of these shortcomings were evident during testing to determine the cause of a failure of a solid rocket motor (SRM). As shown in FIG. 1a, the SRM is composed of segments 1, and one series of tests examined pressures exerted during the stacking of the segments. Particular interest was directed to the maximum pressure exerted on grease 3 from the o-ring 5 trapped in the region as indicated in FIG. 1b. Concern had been raised that a high pressure in this region could initiate a separation between the case insulation 7 and either the upper segment case 9 or the lower segment case 11. The small size of this region and the requirement that no holes were allowed to be drilled through the lower segment case 11 made the implementation of standard pressure transducers difficult.

One object of the present invention is the use of a method of measuring pressure which is useful in small, constricted areas which are not suited to the use of standard pressure transducers. Another object of the invention is to use a technique which is relatively inert so as not to affect the chemical properties of the substancing being measured. Yet another object of the invention is to develop a method of measuring pressure across a wide range, i.e., from less than 50 psi to over 1000 psi. Still another object of the invention is to develop a method of measuring pressure that is inexpensive, and non-destructive and reliable.

SUMMARY OF THE INVENTION

Hollow glass microspheres, commonly known as microballoons, which crush semi-continuously over a wide pressure range, are used as imbedded sensors to record the maximum pressure attained in a fluid. After the impregnated fluid has been subjected to the unknown pressure, a sample of the fluid is again subjected to increasing levels of pressure. Acoustic emissions are monitored by very sensitive microphones. The maximum pressure to which the fluid has been subjected is determined by the pressure at which acoustic emissions from the weakest intact microballoons begin to occur. These Acoustic emissions result from the crushing of these residual intact microballoons as the pressure exceeds the previous maximum.

DETAILED DESCRIPTION OF THE PREFERRED EMBODIMENT

The present invention discloses the novel approach of tagging a fluid with a material that changes irreversibly under pressure. Post test samples of the tagged material are analyzed for this change in order to determine the maximum pressure during the test. Maximum pressure is determined by measuring acoustic emissions from the weakest intact material in the fluid.

Figure 1:
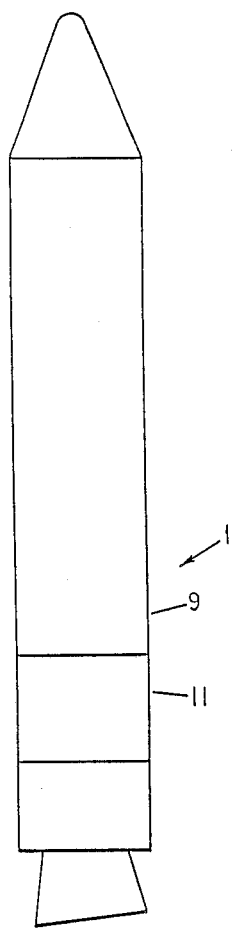
FIGS. 1a and 1b are schematics of a solid rocket motor (SRM) and an expanded view of a joint section of the SRM.
Figure 1:
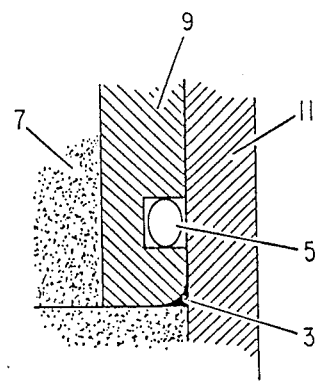
Figure 2A:
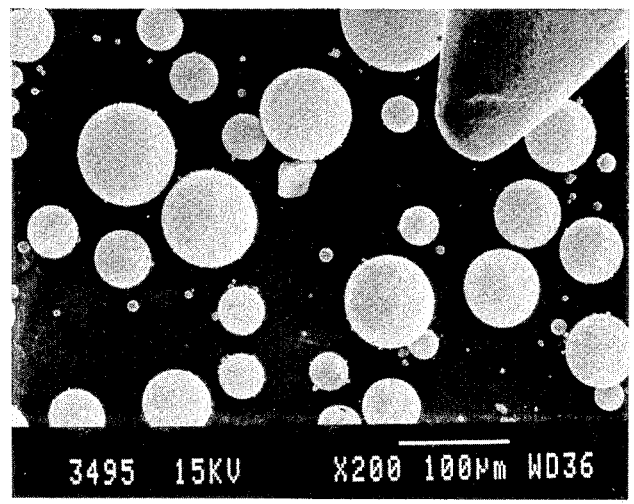
FIGS. 2a and 2b are SEM micrographs (200×) of a sample of microballoons at atmospheric pressure and at a pressure of 500 psi.
Figure 2:
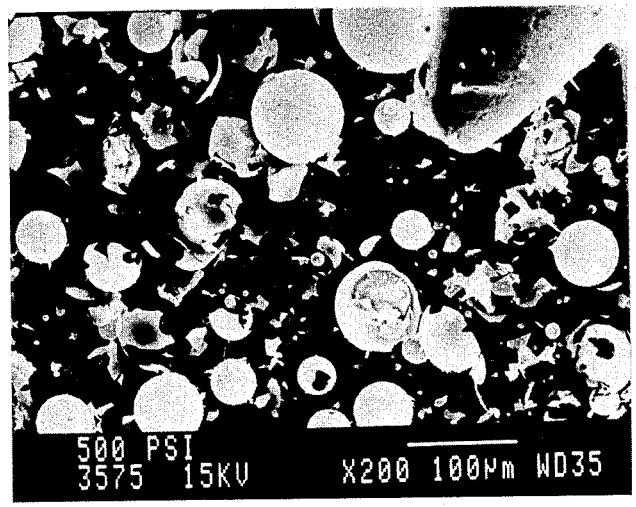

Glass microballoons were chosen to serve as the material. The microballoons used were 3M Model No. C15/250, commonly used as a filler in plastics and epoxies. This material has several properties which make it useful in this application. First, the microballoons are hollow and emit a detectable noise when crushed. Second, the microballoons are small in size—ranging from approximately 2 $\mu$m to approximately 100 $\mu$m in diameter. The SEM Micrograph (200×) shown in FIG. 2a illustrates the typical size distribution. Third, the microballoons' glass composition is relatively chemically inert. As a result, small quantities of microballoons mixed into the grease have a negligible effect on the grease's properties. Fourth, microballoon breakage occurs semi-continuously over a wide range of pressures under hydrostatic pressure; the microballoons break semi-continuously over a pressure range of approximately 50 psi to >1200 psi. This breaking of microballoons is the required irreversible change with pressure.

The technique's procedure consists of four steps. First, microballoons are gently mixed into the grease. Second, the microballoon tagged grease (MTG) is used in place of standard grease in the stacking test. Third, samples of the MTG are recovered at the conclusion of the stacking test. Fourth, the MTG samples are analyzed by slowly pressurizing the samples while monitoring the sample's acoustic emissions. Below the maximum pressure experienced in the stacking test no noise is detected since all microballoons of strength less than this pressure are broken. However, once the sample is pressurized higher than the maximum pressure experienced during the stacking test, noise is emitted as the unbroken (stronger) microballoons begin to break. Thus, the pressure at which the sample begins to make noise is the maximum pressure experienced during the stacking test.

Figure 3:
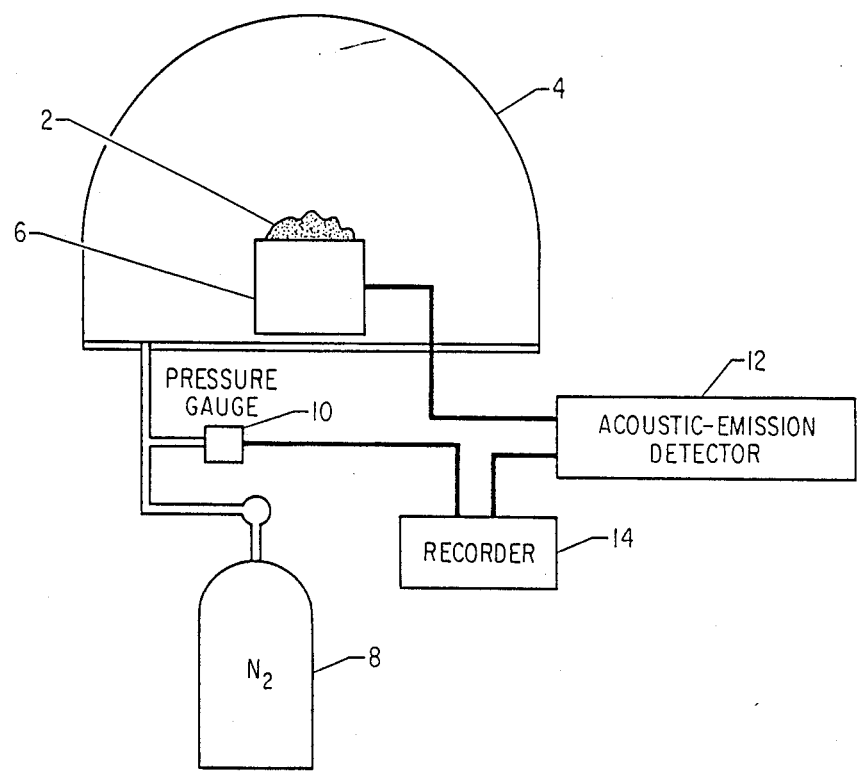
FIG. 3 is a schematic of the microballoon tagged grease (MTG) analysis system.

A schematic of the analysis system is shown in FIG. 3. The sample 2 is placed inside a pressure vessel 4 on or near an acoustic transducer 6. The vessel 4 is pressurized by a gas as controlled by a pressure gauge 10. An acoustic emission detector 12 detects emissions from the sample as the sample is pressurized. Recorder 14 records these emissions as a function of pressure.

Set forth below is a particular example of the use of the invention. In this particular case, the fluid consisted of o-ring grease with a microballoon-to-grease volumetric ratio of 1:10. The microballoons are gently mixed into the fluid (in this case a grease, Dow Corning Molykote 55M). After the tagged grease is subjected to the unknown pressure, samples of the grease are placed on an acoustic transducer in a pressure cell. Nitrogen gas pressurizes the vessel and the acoustic emission signal is recorded as a function of pressure. A 0.1 g sample of grease was placed on an acoustic emission transducer in a pressure vessel. The microballoons break and make noise semi-continuously from 35 psi to greater than 800 psi.

The acoustic emission detector 2 consisted of a PaC R15 transducer, a PAC 1220A preamplifier and a PAC 3000/3004 analysis system. The output of the Barksdale 303H2-10CG-10-P Pressure transducer 10 was fed into the parameter input of the PAC 3000/3004. The PAC system recorded and stored both the acoustic emissions and the pressure transducers output. From the stored data, plots of the number acoustic events versus pressure were generated for analysis.

When the microballoon tagged grease (MTG) is placed on an acoustic transducer and pressure is applied the material makes noise over a wide range of pressures as the different microballoons break. If the grease sample had experienced some hydrostatic force before this test, the earlier force would have broken all of the balloons up to a certain strength. Consequently, no balloons break during the second pressurization until the pressure exceeds the maximum value of the first. The onset of acoustic signals signifies the maximum value of the first pressurization.

Plots were made of a 0.08 g sample of MTG with a microballoon-to-grease volumetric ratio of 1:10 that had not been previously pressurized. Acoustic emission was detected semi-continuously from 48 psi to 800 psi. The broad and asymmetrical distribution peaks at approximately 400 psi, but the number of events, while decreasing at levels above 400 psi, had not dropped off much by 800 psi. In other tests, acoustic events were observed up to the safety limit of the pressure vessel, approximately 1200 psi.

In another example, an MTG sample was pressurized hydrostatically to 191 psi, then placed on the transducer and Pressurized. The results indicated no noise below 191 psi. Acoustic events began to occur at 192 psi, and followed a distribution that was similar to the distribution of acoustic events above 191 psi in a sample that had not previously Pressurized.

The breaking behavior of the microballoons was examined in a series of SEM micrographs taken of a sample following exposure to increasingly greater pressures. The first and last micrographs in the series are shown in FIGS. 2a and 2b respectively. Although it was expected that the larger microballoons would generally break at the lower pressures, no clear correlation was found between diameter and the failure pressure. As can be seen in FIG. 2b, microballoons on the order of 30 $\mu$m were broken while the largest microballoon of order 100 $\mu$m is still intact. It is speculated the observed variation in strength is due to wide variations in wall thickness and quality.

What has been described here was a solution to the specific problem of measuring the maximum pressure on o-ring grease but this technique need not be limited to that fluid. Microballoons could be added to any fluid or elastic material which transmits hydrostatic forces. For example, small rubber "sensors" could be made with microballoons cured into the rubber. These could be placed in normally inaccessible areas inside of some equipment under test. After the test, the sensors are removed and read by acoustic monitoring during re-pressurizations.

We claim:

1. A method of measuring the maximum pressure attained in a fluid, including the steps of:
    (a) mixing a plurality of microballoons into the fluid, wherein the microballoons are crushable within a range of pressures from 0 to 1000 psi;
    (b) subjecting the impregnated fluid to a pressure to be determined, thereby crushing the microballoons which crush at a pressure equal to or less than the Pressure to be determined;
    (c) placing a sample of the impregnated fluid into a testing apparatus wherein acoustic emissions from crushing microballoons can be monitored;
    (d) subjecting the sample to pressures from 0 to a pressure higher than the pressure to be determined; and
    (e) monitoring the acoustic emissions, whereby the pressure at which acoustic emissions begin represents the pressure to which the sample had been subjected.

* * * * *